US008925301B2

(12) United States Patent
Hashimoto

(10) Patent No.: US 8,925,301 B2
(45) Date of Patent: Jan. 6, 2015

(54) VEHICLE AND METHOD FOR CONTROLLING CATALYST DEVICE IN TEMPERATURE

(75) Inventor: Keita Hashimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/979,951

(22) PCT Filed: Feb. 1, 2011

(86) PCT No.: PCT/JP2011/051982
§ 371 (c)(1),
(2), (4) Date: Jul. 16, 2013

(87) PCT Pub. No.: WO2012/104985
PCT Pub. Date: Aug. 9, 2012

(65) Prior Publication Data
US 2013/0305692 A1 Nov. 21, 2013

(51) Int. Cl.
*F01N 3/00* (2006.01)
*F01N 3/02* (2006.01)
*F01N 3/10* (2006.01)
*F01N 3/20* (2006.01)
*F01N 9/00* (2006.01)

(52) U.S. Cl.
CPC ............... *F01N 3/10* (2013.01); *F01N 3/2013* (2013.01); *Y02T 10/26* (2013.01); *F01N 2560/06* (2013.01); *F01N 2590/11* (2013.01); *F01N 9/00* (2013.01); *Y02T 10/47* (2013.01)
USPC ................... 60/277; 60/285; 60/286; 60/295; 60/299

(58) Field of Classification Search
USPC ............................ 60/277, 286, 295, 299, 285
See application file for complete search history.

(56) References Cited

U.S. PATENT DOCUMENTS

| | | | |
|---|---|---|---|
| 2011/0265450 A1* | 11/2011 | Barasa | 60/274 |
| 2012/0000182 A1* | 1/2012 | Gonze et al. | 60/274 |
| 2012/0011831 A1* | 1/2012 | Neisen | 60/285 |
| 2012/0031072 A1* | 2/2012 | Gonze et al. | 60/273 |

FOREIGN PATENT DOCUMENTS

| | | |
|---|---|---|
| JP | A-4-136410 | 5/1992 |
| JP | A-6-173663 | 6/1994 |
| JP | A-10-169433 | 6/1998 |
| JP | A-2000-220442 | 8/2000 |
| JP | A-2003-232251 | 8/2003 |
| JP | A-2005-127285 | 5/2005 |
| JP | A-2009-191681 | 8/2009 |

* cited by examiner

*Primary Examiner* — Jesse Bogue
*Assistant Examiner* — Dapinder Singh
(74) *Attorney, Agent, or Firm* — Oliff PLC

(57) ABSTRACT

A vehicle includes: an engine; an EHC (electrically heated catalyst) electrically heated for purifying exhaust gas of the engine; a temperature sensor for sensing the temperature of the EHC; and an ECU that controls the EHC in temperature. The ECU performs a first estimation process and a second estimation process to estimate the temperature of the EHC and accordingly controls electric power applied to energize the EHC, the first estimation process being performed to estimate the temperature of the EHC based on an output of the temperature sensor before the engine starts, the second estimation process being performed to estimate the temperature of the EHC based on the temperature of the exhaust gas emitted by the engine after the engine is started.

5 Claims, 5 Drawing Sheets

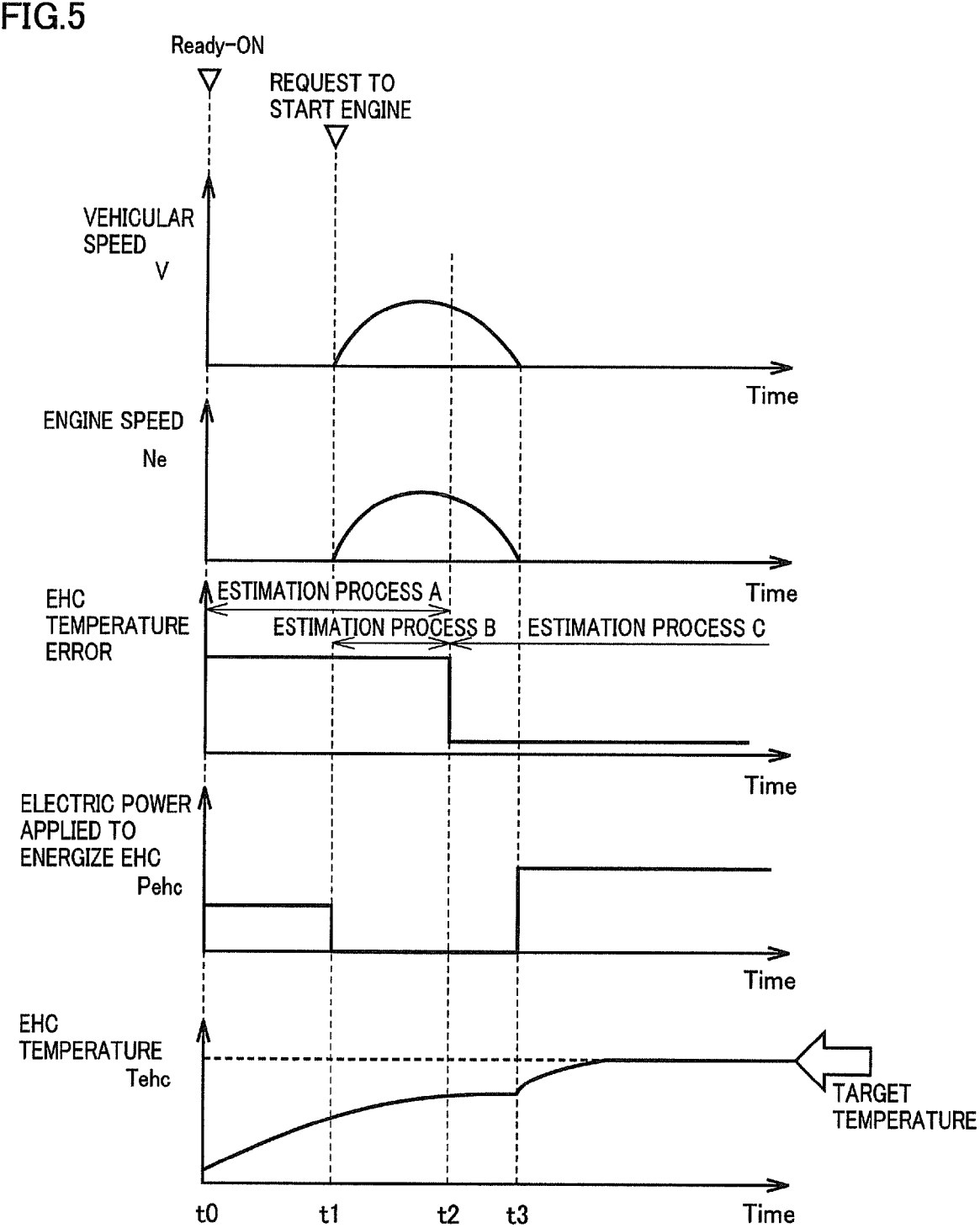

VEHICLE AND METHOD FOR CONTROLLING CATALYST DEVICE IN TEMPERATURE

TECHNICAL FIELD

The present invention relates to a vehicle and a method for controlling a catalyst device in temperature, and particularly to a technique used to estimate the temperature of a catalyst device electrically heatably configured for purifying exhaust gas of an internal combustion engine.

BACKGROUND ART

Generally, a vehicle having an internal combustion engine mounted therein is provided with a catalyst device to purify exhaust gas. The catalyst device does not exhibit its effect unless it is heated to some extent, and accordingly, it is disposed near the internal combustion engine so that it is heated immediately.

However, immediately after the internal combustion engine has just started, i.e., when the catalyst device is still not warm, its purification effect is insufficient. Accordingly, using electric power to warm the catalyst device before starting the internal combustion engine, is considered. Such a catalyst device is also referred to as an electrically heated catalyst (EHC).

Japanese Patent Laying-Open No. 2000-220442 (PTD 1) discloses a vehicle having an EHC mounted therein.

CITATION LIST

Patent Documents

PTD 1: Japanese Patent Laying-Open No. 2000-220442
PTD 2: Japanese Patent Laying-Open No. 2009-191681
PTD 3: Japanese Patent Laying-Open No. 6-173663
PTD 4: Japanese Patent Laying-Open No. 2005-127285

SUMMARY OF INVENTION

Technical Problem

Japanese Patent Laying-Open No. 2000-220442 discloses estimating an EHC's temperature based on an output of an exhaust gas temperature sensor provided downstream of the EHC and an amount of fuel supplied to an engine.

However, a hybrid vehicle or a similar vehicle having a motor mounted therein for travelling may have an internal combustion engine started and stopped repeatedly as required while the vehicle is travelling. When the internal combustion engine is not operated, there is no exhaust gas emitted and the exhaust gas temperature sensor does not provide an output accurately reflecting the EHC's temperature. Accordingly, the internal combustion engine may more frequently be started while the catalyst device cannot accurately be controlled in temperature, and a sufficient catalytic effect cannot be exhibited and carbon monoxide, hydrocarbon and the like may be discharged into exhaust gas for an increased period of time.

It may also be suggested to dispose a temperature sensor in a vicinity of an EHC to measure the EHC's temperature. However, a hybrid vehicle has a high voltage battery mounted therein and it is assumed that the EHC is supplied with electric power from this high voltage battery. A portion that is supplied with the high voltage battery's voltage is required to be electrically insulated from the vehicle's body earth. The vehicle has an exhaust pipe coupled with the body earth, and it is thus difficult to ensure that a heater, a catalyst and the like of an EHC accommodated in the exhaust pipe receive voltage from the high voltage battery while they are electrically insulated from the exhaust pipe. Accordingly, ensuring insulation is also an issue for the temperature sensor. Furthermore, the EHC has a catalyst carrier formed of ceramics or the like, and if the temperature sensor is inserted through the exhaust pipe, a difference between the coefficients of thermal expansion of the catalyst carrier and the temperature sensor may result in causing stress and damaging the EHC. Accordingly, it is difficult to insert the temperature sensor into the EHC and the like.

The present invention contemplates a vehicle allowing an EHC to be controlled in temperature more accurately to provide a better catalytic effect, and a method for controlling a catalyst device in temperature.

Solution to Problem

The present invention in summary provides a vehicle including: an internal combustion engine; a catalyst device electrically heatably configured for purifying exhaust gas of the internal combustion engine; a temperature sensor for sensing a temperature of the catalyst device; and a control device that controls the catalyst device in temperature. The control device performs a first estimation process and a second estimation process to estimate the temperature of the catalyst device and accordingly controls electric power applied to energize the catalyst device, the first estimation process being performed to estimate the temperature of the catalyst device based on an output of the temperature sensor before the internal combustion engine starts, the second estimation process being performed to estimate the temperature of the catalyst device based on a temperature of the exhaust gas emitted by the internal combustion engine after the internal combustion engine is started.

Preferably, the second estimation process has a temperature estimation error smaller than a temperature estimation error of the first estimation process, and the control device varies the electric power applied to energize the catalyst device, based on a difference between the temperature estimation errors.

More preferably, when the control device obtains an estimated temperature of the catalyst device from the second estimation process, the control device controls the electric power applied to energize the catalyst device so that the estimated temperature of the catalyst device approaches a target temperature to be closer thereto than when the first estimation process is performed to provide an estimated temperature of the catalyst device.

Preferably, the temperature sensor is disposed in an exhaust path that discharges the exhaust gas to outside the vehicle via the catalyst device, the temperature sensor being disposed in a vicinity of the catalyst device and spaced from the catalyst device, and the control device determines the temperature of the exhaust gas, based on a temperature measured with the temperature sensor after the internal combustion engine is started.

The present invention in another aspect provides a method for controlling a catalyst device in temperature, the catalyst device being electrically heatably configured for purifying exhaust gas of an internal combustion engine, the method including the steps of: estimating a temperature of the catalyst device by a first method of estimating the temperature of the catalyst device based on an output of a temperature sensor before the internal combustion engine starts; estimating a temperature of the catalyst device by a second method of estimating the temperature of the catalyst device based on that of the exhaust gas emitted by the internal combustion engine after the internal combustion engine is started; and controlling electric power applied to energize the catalyst device, based on the temperatures of the catalyst device as estimated in the first and second methods.

Advantageous Effect of Invention

The present invention thus allows an EHC to be controlled in temperature more accurately to provide a better catalytic effect.

BRIEF DESCRIPTION OF DRAWINGS

FIG. 5 is an operation waveform diagram for illustrating an example of controlling a catalyst in temperature according to the present embodiment.

DESCRIPTION OF EMBODIMENTS

Hereinafter reference will be made to the drawings to describe the present invention in embodiments. In the figures, identical or corresponding components are identically denoted and will not be described repeatedly in detail.

Figure 1:
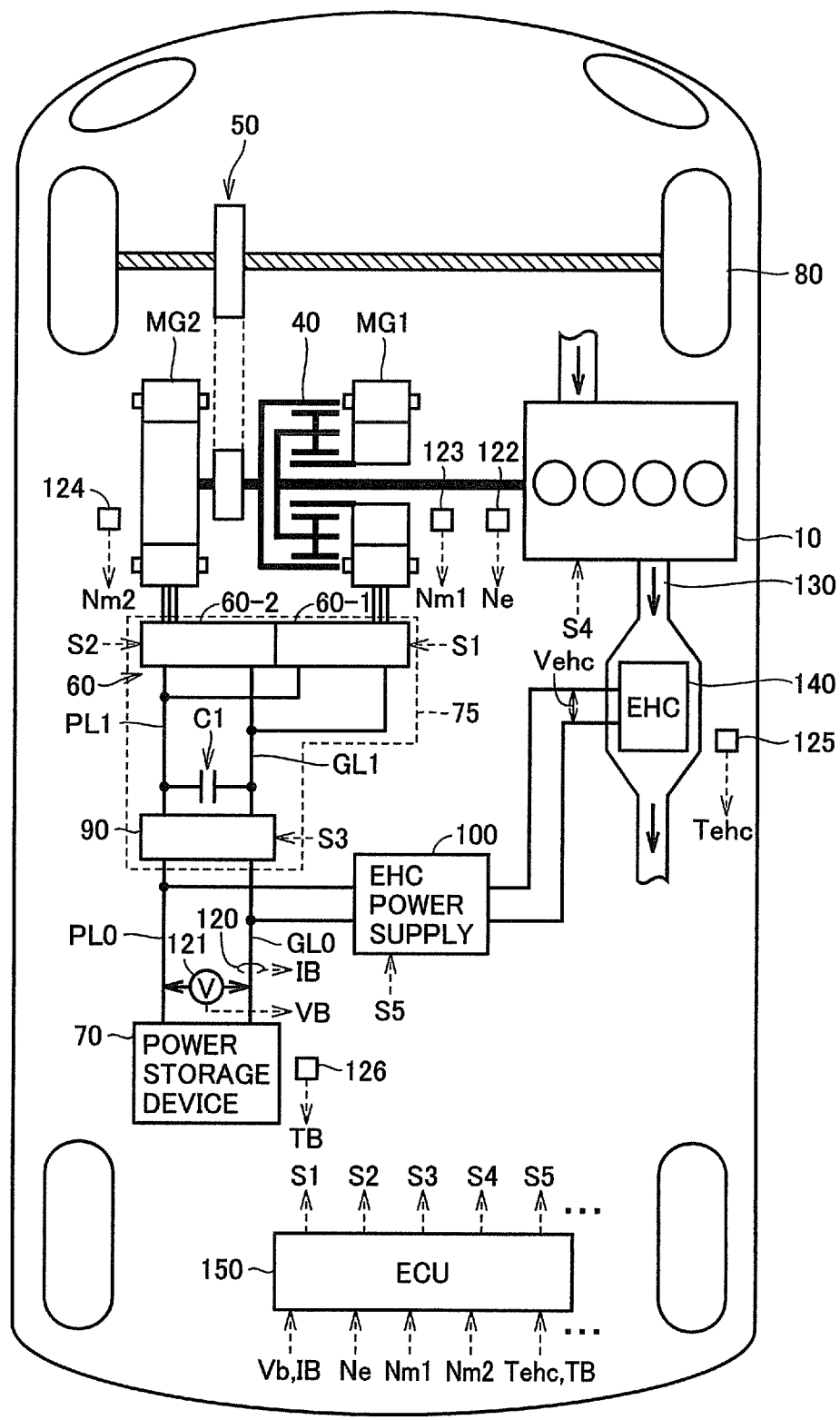
FIG. 1 is a general block diagram of a hybrid vehicle according to an embodiment of the present invention.

FIG. 1 is a general block diagram of a hybrid vehicle according to an embodiment of the present invention.

With reference to FIG. 1, a hybrid vehicle 1 includes an engine 10, a motor generator MG1, a motor generator MG2, a power split device 40, a speed reducer 50, and a driving wheel 80.

Engine 10 is an internal combustion engine which generates driving force rotating a crankshaft with combustion energy produced when a mixture of air introduced into a combustion chamber and fuel is burnt. Motor generator MG1 and motor generator MG2 are alternating current motors, and they are for example three-phase alternating-current synchronous motors.

Hybrid vehicle 1 travels with driving force output from at least one of engine 10 and motor generator MG2. The driving force generated by engine 10 is divided into two paths by power split device 40. That is, one is a path transmitting driving force to driving wheel 80 via speed reducer 50, and the other is a path transmitting driving force to motor generator MG1.

Power split device 40 includes a planetary gear configured of a sun gear, a pinion gear, a carrier, and a ring gear. The pinion gear engages with the sun gear and the ring gear. The carrier supports the pinion gear rotatably and is also coupled with the crankshaft of engine 10. The sun gear is coupled with the axis of rotation of motor generator MG1. The ring gear is coupled with the axis of rotation of motor generator MG2 and speed reducer 50.

Engine 10, motor generator MG1 and motor generator MG2, coupled with one another via power split device 40, rotate at rates having a relationship connected by a straight line in a nomographic chart.

Hybrid vehicle 1 further includes a motor drive unit 75. Motor drive unit 75 includes an inverter 60, a smoothing capacitor C1, a voltage converter 90, and a power storage device 70.

Inverter 60 controls driving motor generator MG1 and motor generator MG2. Motor generator MG1 generates electric power by using the motive power of engine 10 divided by power split device 40. The electric power generated by motor generator MG1 is converted from an alternating current to a direct current by inverter 60, and stored to power storage device 70.

Motor generator MG2 generates driving force using at least one of the electric power stored in power storage device 70 and the electric power generated by motor generator MG1. The driving force of motor generator MG2 is transmitted to driving wheel 80 via speed reducer 50. Note that while FIG. 1 shows driving wheel 80 as a front wheel, a rear wheel in place of or together with the front wheel may be driven by motor generator MG2.

Note that when the vehicle is braked, motor generator MG2 is driven by driving wheel 80 via speed reducer 50, and motor generator MG2 operates as a power generator. Thus, motor generator MG2 also functions as a regeneration brake converting the vehicle's kinetic energy to electric power. The electric power generated by motor generator MG2 is stored to power storage device 70.

Power storage device 70 can for example be a lead battery, a nickel metal hydride battery, a lithium ion battery or a similar secondary battery, an electric double layer capacitor or a similar large capacity capacitor, or the like.

Inverter 60 includes an inverter 60-1 and an inverter 60-2. Inverter 60-1 and inverter 60-2 are connected to voltage converter 90 in parallel.

Inverter 60-1 is provided between voltage converter 90 and motor generator MG1. Inverter 60-1 operates in response to a control signal S1 received from an electronic control unit (ECU) 150 to control driving motor generator MG1.

Inverter 60-2 is provided between voltage converter 90 and motor generator MG2. Inverter 60-2 operates in response to a control signal S2 received from ECU 150 to control driving motor generator MG2.

Voltage converter 90 performs voltage conversion between power storage device 70 and inverter 60. Voltage converter 90 boosts the voltage of power storage device 70 (more precisely, a voltage between a power supply line PL0 and a ground line GL0) to attain a target voltage value indicated by a control signal S3 received from ECU 150, and outputs the boosted voltage to inverter 60. Thus, the voltage of power supply line PL1 and ground line GL0 (hereinafter also referred to as "direct current voltage VH associated with high voltage" or simply "voltage VH") is controlled to attain the target voltage value indicated by control signal S3.

Smoothing capacitor C1 is connected between power supply line PL1 and ground line GL1. Note that ground lines GL1 and GL0 are connected in voltage converter 90. Smoothing capacitor C1 smoothes direct current voltage VH associated with high voltage.

Engine 10 emits exhaust gas which is in turn passed through an exhaust path 130 and discharged into the air. Exhaust path 130 has an intermediate portion provided with an electrically heated catalyst (EHC) 140.

EHC 140 is configured to electrically heat a catalyst purifying exhaust gas. EHC 140 is connected to an EHC power supply 100 to receive electric power therefrom to heat the catalyst. Note that various known EHCs are applicable to EHC 140.

EHC power supply 100 is provided between EHC 140 and power storage device 70. EHC power supply 100 is connected to power storage device 70 in parallel with voltage converter 90. EHC power supply 100 operates in response to a control signal S5 received from ECU 150 to adjust electric power supplied from power storage device 70 to EHC 140. For example, when EHC 140 has a temperature Tehc lower than a prescribed temperature and has purification power lower than a target level, ECU 150 controls EHC power supply 100 to supply electric power from power storage device 70 to EHC 140. Thus, EHC 140 is driven and the catalyst provided in EHC 140 is heated, and EHC 140 can thus exhibit enhanced purification power.

EHC power supply 100 can operate in response to control signal S5 to vary voltage supplied to EHC 140. EHC power supply 100 is configured for example to supply a voltage (for example of 200 V) of power storage device 70 as it is or supply the voltage of power storage device 70 that has been bucked (for example to 50-60 V).

Furthermore, hybrid vehicle 1 further includes a current sensor 120, a voltage sensor 121, rotational speed sensors 122, 123, 124, and temperature sensors 125 and 126.

Voltage sensor 121 measures voltage VB between the terminals of power storage device 70. Temperature sensor 126 senses temperature TB of power storage device 70. Current sensor 120 senses electric current IB flowing to power storage device 70 to monitor the state of charge (SOC) of power storage device 70 together with voltage sensor 121.

Rotational speed sensors 122, 123, 124 sense rotational speed Ne of engine 10, rotational speed Nm1 of motor generator MG1, and rotational speed Nm2 of motor generator MG2, respectively. Temperature sensor 125 senses temperature Tehc of EHC 140. These sensors transmit their sensed results to ECU 150.

ECU 150 is configured to incorporate a central processing unit (CPU) and a memory (not shown) therein and operate in accordance with a map and a program stored in the memory to perform a predetermined operation process. Alternatively, ECU 150 may be configured to have at least a portion configured to perform a predetermined numerical/logical operation process by an electronic circuit or similar hardware.

ECU 150 operates in accordance with the information of each sensor and the like to generate control signals S1-S5 mentioned above, and outputs the generated control signals S1-S5 to each component. For example, ECU 150 operates in accordance with the information of each sensor and the like to set a torque command value Tgcom for motor generator MG1 and a torque command value Tmcom for motor generator MG2, generates control signal S1 causing a torque Tg of motor generator MG1 to match torque command value Tgcom and control signal S2 causing a torque Tm of motor generator MG2 to match torque command value Tmcom, and outputs control signals S1 and S2 to inverter 60-1 and inverter 60-2, respectively. Furthermore, ECU 150 operates in accordance with the information of each sensor and the like to set a command value for an amount of fuel injected for engine 10, generates control signal S4 causing an amount of fuel actually injected for engine 10 to match the command value, and outputs the signal to engine 10.

Figure 2:
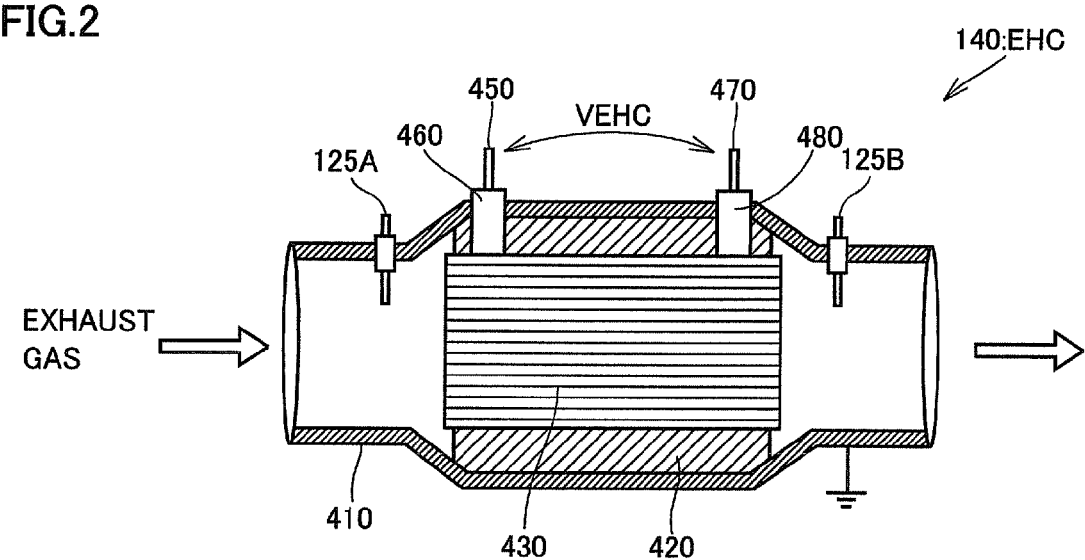
FIG. 2 is a cross section schematically showing a configuration of an EHC 140 along an exhaust pipe shown in FIG. 1.

FIG. 2 is a cross section schematically showing a configuration of EHC 140 along an exhaust pipe shown in FIG. 1.

With reference to FIG. 2, EHC 140 is configured including a casing 410, an insulating member 420, an EHC carrier 430, temperature sensors 125A and 125B, a positive electrode 450, a positive electrode coating 460, a negative electrode 470, and a negative electrode coating 480. EHC 140 is an example of an electrically heated catalyst device.

Casing 410 is a casing provided for EHC 140 and configured for example of stainless steel or similar metallic material and has its upstream and downstream ends connected via a coupling member (not shown) to exhaust path 130 of FIG. 1.

Insulating member 420 is provided to cover an inner circumferential surface of casing 410 and provides thermal insulation and electrical insulation. Insulating member 420 is implemented for example as alumina or similar insulating material.

EHC carrier 430 is an electrically conductive catalyst carrier having a honeycomb cross section orthogonal to the direction of the exhaust gas. Note that a carrier refers to a substance used as a foundation to fix (or carry) a substance exhibiting adsorption, catalytic activity and the like. EHC carrier 430 carries an oxidation catalyst (not shown), configured to be capable of purifying exhaust gas passing through EHC 430, as appropriate. Note that the catalyst carried by EHC carrier 430 may be a three-way catalyst.

Positive electrode 450 is an electrode having one end fixed adjacent to an end of EHC carrier 430 upstream of exhaust gas for applying positive voltage. Positive electrode 450 has the other end connected to EHC power supply 100 of FIG. 1. Note that positive electrode 450 is partially covered with positive electrode coating 460 of resin providing electrical insulation, and casing 410 and positive electrode 450 are thus electrically insulated from each other.

Upstream temperature sensor 125A is disposed in an exhaust pipe upstream of EHC carrier 430 and configured to be capable of sensing temperature in a vicinity of EHC carrier 430. Upstream temperature sensor 125A is electrically connected to ECU 150 of FIG. 1, and the temperature sensed by the sensor is referenced by ECU 150 periodically or non periodically.

Negative electrode 470 is an electrode having one end fixed adjacent to an end of EHC carrier 430 downstream of exhaust gas for supplying a reference potential. Negative electrode 470 has the other end connected to EHC power supply 100 of FIG. 1. Note that negative electrode 470 is partially covered with negative electrode coating 480 of resin providing electrical insulation, and casing 410 and negative electrode 470 are thus electrically insulated from each other.

Downstream temperature sensor 125B is disposed in an exhaust pipe downstream of EHC carrier 430 and configured to be capable of sensing temperature in a vicinity of EHC carrier 430. Downstream temperature sensor 125B is electrically connected to ECU 150, and the temperature sensed by the sensor is referenced by ECU 150 periodically or non periodically.

In EHC 140 thus configured, when positive voltage is applied to positive electrode 450 with the electric potential of negative electrode 470 serving as a reference, an electric current flows through electrically conductive EHC carrier 430, and EHC carrier 430 generates heat. The heat promotes raising the temperature of the oxidation catalyst carried by EHC carrier 430, and EHC 140 rapidly transitions to a catalytically active state.

Note that such a configuration of EHC 140 is only an example, and the EHC carrier's configuration, each electrode's arrangement and how it is controlled, and the like may be a variety of known manners.

Herein, EHC 140 has EHC carrier 430 formed with a material having a relatively large electric resistance (e.g., ceramics) in order to sufficiently secure its heat capacity. In order to cause EHC carrier 430 of a large heat mass to sufficiently generate heat, with the EHC at low temperature, there is a tendency that voltage applied is inevitably increased, and accordingly, EHC 140 is set to be driven on a relatively high voltage of approximately 200 V when it is normally driven to warm the catalyst with electric power received from EHC power supply 100 with the FIG. 1 power storage device 70 serving as an electric power source.

Furthermore, EHC power supply 100 of FIG. 1 is electrically connected to the positive and negative electrodes of EHC 140, and is configured to be capable of supplying positive electrode 450 with a direct-current drive voltage Vehc. In EHC carrier 430, a drive current Iehc corresponding to direct-current drive voltage Vehc is generated, and EHC carrier 430 generates heat corresponding to a quantity of heat generated by drive current Iehc and electric resistance Rehc of EHC carrier 430. Note that EHC power supply 100 of FIG. 1 includes a DC-DC converter, and is configured to be capable of supplying as direct-current drive voltage Vehc not only the high voltage of 200 V that is the aforementioned normal drive voltage but also a low voltage of 50 V or lower. This type of voltage boosting and bucking function is also controlled by ECU 150.

As shown in FIG. 2, temperature sensors 125A and 125B are slightly spaced from EHC carrier 430 because there is a possibility that when the temperature sensors are inserted into EHC carrier 430 through the exhaust pipe, different coefficients of thermal expansion may result in causing stress and hence damage.

A hybrid vehicle or a similar vehicle having a motor mounted therein for travelling may have an internal combustion engine started and stopped repeatedly as required while the vehicle is travelling. When the internal combustion engine is not operated, there is no exhaust gas emitted and temperature sensors 125A and 125B do not provide an output accurately reflecting the EHC's temperature. Accordingly, the internal combustion engine may more frequently be started while the catalyst device cannot accurately be controlled in temperature, and a sufficient catalytic effect cannot be exhibited and carbon monoxide, hydrocarbon and the like may be discharged into exhaust gas for an increased period of time.

However, applying increased electric power to the EHC so that the EHC may sufficiently reach a target temperature while the EHC's temperature is inaccurately estimated may result in overenergization damaging the EHC carrier.

Accordingly, before the engine starts for a first time, ECU 150 on one hand handles an output of temperature sensor 125A or 125B exactly as the EHC's temperature, and ECU 150 on the other hand also allows for a large error and applies electric power of such an extent that the EHC is not overenergized and damaged.

Then, when the user requests increased acceleration, the vehicle's speed exceeds a threshold value, the battery's stored electric power is reduced or the like, and accordingly, the engine starts for the first time, then, ECU 150 employs a significantly precise temperature estimation method to estimate the EHC's temperature. Then thereafter ECU 150 expects that the error is decreased, and ECU 150 increases electric power and applies it to the EHC to set the EHC at an appropriate temperature.

In particular, when a plug-in hybrid vehicle or the like is started, then thereafter for some period of time the vehicle may travel without operating the engine. At the time, basically there is no exhaust gas and accordingly, no catalyst is required, and if the catalyst is not preheated to an optimal temperature, there is no issue of poor emission. Once the engine has been started, the EHC's temperature is estimated accurately and the catalyst is held at an appropriate temperature, and satisfactory exhaust gas purification performance can be provided.

Figure 3:
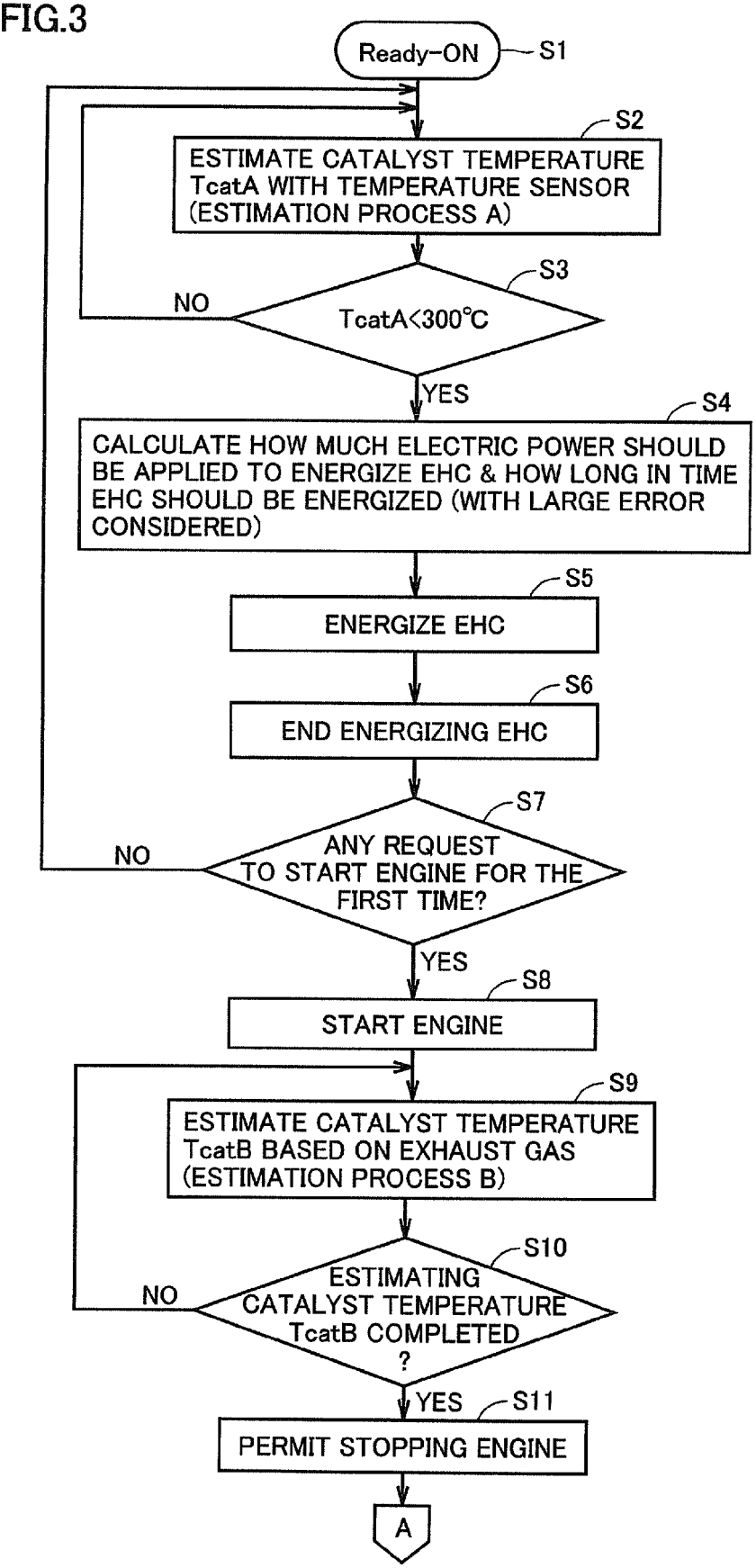
FIG. 3 is a first flowchart for illustrating how energizing the EHC is controlled.

FIG. 3 is a first flowchart for illustrating how energizing the EHC is controlled.

Figure 4:
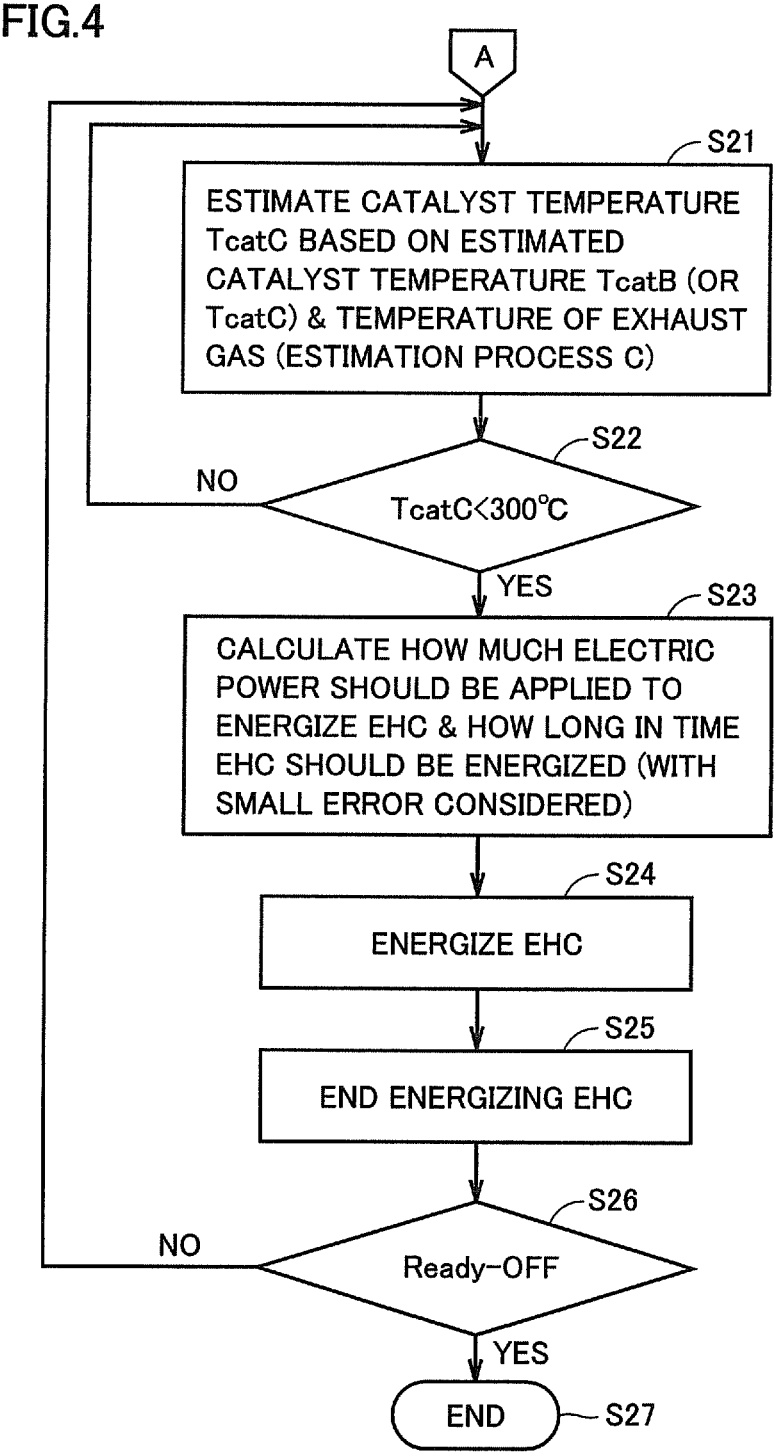
FIG. 4 is a second flowchart for illustrating how energizing the EHC is controlled.

FIG. 4 is a second flowchart for illustrating how energizing the EHC is controlled.

With reference to FIG. 1 and FIG. 3, initially the user starts the vehicle, and the vehicle is set in a Ready-ON state (Step S1) and a process starts, and in Step S2, ECU 150 estimates a catalyst temperature TcatA based on temperature sensed by temperature sensors 125A and 125B. An estimation process A done at the time provides estimation. Estimation process A can for example be a process handling temperature that is sensed by one of temperature sensors 125A and 125B exactly as catalyst temperature TcatA, a process handling an average of temperature sensors 125A and 125B as catalyst temperature TcatA, or the like.

Subsequently, in Step S3, whether catalyst temperature TcatA is lower than a threshold value, e.g., 300° C., is determined. If catalyst temperature TcatA is equal to or larger than the threshold value (e.g., 300° C.) in Step S3, the control returns to Step S2. In that case, the catalyst is warm, and if the engine is immediately started, the catalyst can process exhaust gas. In contrast, if catalyst temperature TcatA is lower than the threshold value (e.g., 300° C.) in Step S3, the control proceeds to Step S4. Note that 300° C. is an example and the temperature threshold value may be a different temperature.

In Step S4, ECU 150 calculates how much electric power should be applied to energize the EHC and how long in time the EHC should be energized. How much electric power should be applied to energize the EHC or how long in time the EHC should be energized is determined with a large error taken into consideration. In other words, to prevent overenergization excessively increasing the catalyst's temperature and destroying the catalyst, a large error is taken into consideration to determine that moderate electric power should be applied to energize the EHC and/or that the EHC should be energized for a moderate period of time.

Subsequently, in Step S5, ECU 150 transmits an instruction to EHC power supply 100 to energize the EHC and applies the determined electric power only for the determined period of time to energize the EHC. Once the EHC has been energized for the determined period of time, ECU 150 proceeds to step S6 to end energizing the EHC. Then, the control proceeds to Step S7.

In Step S7, whether there is a request to start the engine for a first time is determined. If the Ready-ON state has been set and thereafter a request is not received to start the engine, the control returns to step S2 and estimation process A is performed to repeat a process to estimate the EHC's temperature.

For a request to start the engine, there is a choice for example to immediately start the engine once the vehicle has been started by the user. In that case, once the user has operated a start switch, the control will immediately proceed from Step S7 to Step S8.

Furthermore, a user of a plug-in hybrid vehicle or a similar vehicle that uses externally charged electric power more preferentially than fuel desires to drive the engine for as minimal a period of time as possible, and accordingly, a request to start the engine immediately after the vehicle is started is issued only when the battery has a significantly reduced state of charge or when a large driving force is requested or the like. Accordingly, after such a vehicle has been externally charged a request to start the engine is not issued for some period of time, and when the vehicle has traveled for some period of time and the battery's SOC is accordingly reduced or a large driving force is requested or the like, a request to start the engine is issued.

In Step S7, if a request to start the engine is received for a first time after the Ready-ON state is set, the control proceeds to Step S8. In Step S8, ECU 150 starts engine 10. Specifically, ECU 150 rotates motor generator MG1 by inverter 60 to crank engine 10.

Then, after engine 10 has been started, ECU 150 uses an estimation process B based on exhaust gas to estimate a catalyst temperature TcatB. Completing estimation process B requires some period of time, and accordingly, before estimation process B is completed (NO at Step S10), ECU 150 prohibits stopping engine 10 and the control returns to Step S9 to continue estimation process B.

Estimation process B can be done in a method described for example in Japanese Patent Laying-Open No. 2005-127285, i.e., obtaining a weighted average of the temperature sensed by upstream temperature sensor 125A and that sensed by upstream temperature sensor 125A, or a method subjecting that weighted average and the temperature estimated one estimation cycle before to additional weighted averaging, or the like.

Catalyst temperature TcatB estimated in estimation process B has a smaller error than catalyst temperature TcatA estimated in estimation process A.

If estimation process B is completed in Step S10, the control proceeds to Step S11 and ECU 150 permits stopping engine 10. After this point of time, engine 10 is stopped for example when a reduced driving force is requested or it is no longer necessary to operate engine 10, or operating engine 10 results in power storage device 70 having a sufficiently increased SOC, or the like.

Step S11 is followed by Step S21 shown in FIG. 4. In Step S21, a process is performed to estimate a catalyst temperature TcatC based on estimated catalyst temperature TcatB (or TcatC) (an estimation process C).

While the engine is operated, estimation process C is done in a method similar to estimation process B. In other words, estimation process C can be done in a method to obtain a weighted average of the temperature sensed by upstream temperature sensor 125A and that sensed by upstream temperature sensor 125A, or a method subjecting that weighted average and the temperature estimated one estimation cycle before to additional weighted averaging, or the like.

Furthermore, while the engine is stopped, estimation process C can be done by estimation based on temperature TcatB or TcatC estimated one estimation cycle before and temperature sensors 125A and 125B. For example, how the temperature estimated one estimation cycle before is cooled in an ambient of the temperature measured with temperature sensor 125A can previously be mapped, modeled or the like to allow the catalyst's temperature to be estimated. Estimation process C performs an estimation process based on estimated temperature TcatB or TcatC with an error once reduced, and is accordingly, more precise than estimation process A.

Once estimation process C has been completed in Step S21, the control proceeds to Step S22 to determine whether estimated catalyst temperature TcatC is lower than the threshold value (e.g., 300° C.).

If catalyst temperature TcatC is equal to or larger than the threshold value (e.g., 300° C.) in Step S22, the control returns to Step S21. In that case, the catalyst is warm, and if the engine is immediately started, the catalyst can process exhaust gas. In contrast, if catalyst temperature TcatC is lower than the threshold value (e.g., 300° C.) in Step S22, the control proceeds to Step S23. Note that 300° C. is indicated as an exemplary temperature threshold value and it may be different temperature.

In Step S23, ECU 150 calculates how much electric power should be applied to energize the EHC and how long in time the EHC should be energized. How much electric power should be applied to energize the EHC and how long in time the EHC should be energized is determined with the fact that the current error is smaller than when step S4 is performed taken into consideration. In other words, how much electric power should be applied to energize the EHC and how long in time the EHC should be energized are determined to prevent overenergization excessively increasing the catalyst's temperature and destroying the catalyst and also allow the catalyst to approach a target temperature as closely as possible with the fact that the current error is small taken into consideration.

Subsequently, in Step S24, ECU 150 transmits an instruction to EHC power supply 100 to energize the EHC and applies the determined electric power only for the determined period of time to energize the EHC. Once the EHC has been energized for the determined period of time, ECU 150 proceeds to step S25 to end energizing the EHC. Then, the control proceeds to Step S26.

In Step S26, whether the user has operated a switch to set the vehicle to a Ready-OFF state is determined. If the user does not perform a Ready-OFF operation, the control returns to Step S21, and estimation process C is continued to continue to estimate the catalyst's temperature. If the Ready-OFF operation is performed in Step S26, the control proceeds to Step S27 to end the estimation process.

Note that if the Ready-OFF operation is performed, estimation process C may be continued for some period of time, and when the vehicle is restarted within a predetermined period of time, catalyst temperature TcatC may exactly be used and the FIG. 4 step S21 et seq. may be performed to start an estimation process.

FIG. 5 is an operation waveform diagram for illustrating an example of controlling a catalyst in temperature according to the present embodiment.

With reference to FIG. 1 and FIG. 5, initially at time t0 the user starts the vehicle and the vehicle is set in the Ready-ON state for the sake of illustration. At the time, the vehicle is in a condition allowing the vehicle to travel. Note, however, that, for times t0-t1, vehicular speed V is zero and engine speed Ne is also zero. For that period of time, estimation process A (see FIG. 3, Step S2) is done to estimate the EHC's temperature, and accordingly, a large EHC temperature error is involved. To avoid emitting undesirable gas when the engine is started, the catalyst is functioned by providing electric power Pehc to energize the EHC for times t0-t1 and preheating the EHC, and thus increasing EHC temperature Tehc. Note, however, that as there is a large EHC temperature error, electric power Pehc applied to energize the EHC is moderately set to avoid overheating the EHC.

At time t1, the user steps on the accelerator pedal or the like to issue a request to start the engine. Accordingly, engine speed Ne starts to increase and vehicular speed V also increases. As the engine has been started, exhaust gas is generated, and the exhaust gas's temperature before the gas passes through the catalyst and that after the gas has passed through the catalyst can be measured with temperature sensors 125A and 125B. Accordingly, at time t1, estimation process A is continued and estimation process B also starts (see FIG. 3, Step S9).

For times t1-t3, the engine is in operation, and the vehicular speed is not zero, either. For that period of time, the engine emits exhaust gas and the catalyst is heated by the heat of the exhaust gas, and accordingly, EHC temperature Tehc is further increased. However, the target temperature has not yet been reached.

At time t2, the estimation process by estimation process B is completed, and estimated temperature with a reduced error and hence high precision is calculated. Then at time t2 estimation process C is performed (Step S21). Accordingly, after time t2 et seq., the EHC's temperature error is reduced.

Then after time t3, i.e., after the vehicle is stopped and engine speed Ne is also zeroed, the EHC is again energized to heat the catalyst. At the time, the EHC's temperature error has been reduced, and electric power Pehc applied to energize the EHC can be increased to be larger than the value applied for times t0-t1. The EHC's temperature can thus further be close to the target temperature.

Finally, an embodiment of the present invention is summarized again with reference to the drawings. Vehicle 1 shown in FIG. 1 includes engine 10, electrical heated catalyst (EHC) 140 electrically heatably configured for purifying exhaust gas of engine 10, temperature sensor 125 for sensing the temperature of EHC 140, and ECU 150 that controls EHC 140 in temperature. As shown in FIG. 5, ECU 150 performs a first estimation process to estimate the temperature of EHC 140 based on an output of the temperature sensor before engine 10 starts (times t0-t1) (estimation process A) and a second estimation process to estimate the temperature of EHC 140 based on that of the exhaust gas emitted by engine 10 after engine 10 is started (estimation processes B and C) to estimate the temperature of EHC 140 and control the electric power applied to energize EHC 140.

Preferably, as shown in FIG. 5, the second estimation process (estimation processes B and C) has an EHC temperature estimation error smaller than that of the first estimation process (estimation process A), and ECU 150 varies electric power applied to energize the EHC, based on a difference between the temperature estimation errors. That is, electric power Pehc applied to energize the EHC is increased to be larger for time t3 et seq. than times t0-t1.

More preferably, when ECU 150 obtains an estimated temperature of EHC 140 from the second estimation process (estimation processes B and C) (see FIG. 5, time t3 et seq.), ECU 150 controls electric power applied to energize the EHC so that the estimated temperature of EHC 140 approaches a target temperature to be closer thereto than when the first estimation process (estimation process A) is performed to provide an estimated temperature of EHC 140 (t0-t1).

Preferably, as illustrated in FIG. 2, temperature sensors 125A and 125B are disposed in an exhaust path that discharges exhaust gas to outside the vehicle via EHC 140, and the temperature sensors are disposed in a vicinity of EHC 140 and spaced from EHC carrier 430. ECU 150 determines exhaust gas's temperature based on the temperature measured with the temperature sensor after engine 10 is started.

As shown in FIG. 3 and FIG. 4, the present invention in another aspect provides a method for controlling EHC (140) in temperature, EHC (140) being electrically heatably configured for purifying exhaust gas of engine (10), including the steps of: estimating the temperature of EHC 140 by a first method of estimating the temperature of EHC 140 based on an output of a temperature sensor before engine 10 starts (estimation process A) (S2); estimating the temperature of EHC 140 by a second method of estimating the temperature of EHC 140 based on that of the exhaust gas emitted by engine 10 after engine 10 is started (estimation processes B and C) (S21); and controlling electric power applied to energize EHC 140, based on the temperatures of EHC 140 as estimated in the first and second methods (S4, S5, S23, S24).

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST

1: hybrid vehicle; 10: engine; 40: power split device; 50: speed reducer; 60: inverter; 70: power storage device; 75: motor drive unit; 80: driving wheel; 90: voltage converter; 100: EHC power supply; 120: current sensor; 121: voltage sensor; 122, 123, 124: rotational speed sensor; 125, 125A, 125B, 126: temperature sensor; 130: exhaust path; 410: casing; 420: insulating member; 430: EHC carrier; 450: positive electrode; 460: positive electrode coating; 470: negative electrode; 480: negative electrode coating; C1: smoothing capacitor; GL0, GL1: ground line; MG1, MG2: motor generator; PL0, PL1: power supply line.

The invention claimed is:

1. A vehicle comprising:
a motor for travelling;
an internal combustion engine;
a catalyst device electrically heatably configured for purifying exhaust gas of said internal combustion engine;
a temperature sensor for sensing a temperature in an exhaust pipe of said internal combustion engine; and
an electronic control unit configured to control a temperature of said catalyst device,
said electronic control unit performing a first estimation process and a second estimation process to estimate a temperature of said catalyst device and accordingly controlling electric power applied to energize said catalyst device, said first estimation process being performed to estimate the temperature of said catalyst device by using an output of said temperature sensor after the vehicle is started by a user until said internal combustion engine starts for a first time while the vehicle is travelling by said motor for travelling, said second estimation process being performed to estimate the temperature of said catalyst device by using an output of said temperature sensor while said internal combustion engine is in operation,
said second estimation process having a temperature estimation error smaller than a temperature estimation error of said first estimation process,
said electronic control unit varying the electric power applied to energize said catalyst device, based on a difference between said temperature estimation errors.

2. The vehicle according to claim 1, wherein
after the vehicle has been started by the user when an estimation of the temperature of said catalyst device with said second estimation process has been completed, and said internal combustion engine is not in operation, then, said electronic control unit performs a third estimation process to estimate a temperature of said catalyst device and accordingly controls the electric power applied to said catalyst device, said third estimation process being performed to estimate the temperature of said catalyst device based on an estimated temperature obtained in said second estimation process and an output of said temperature sensor.

3. The vehicle according to claim 1, wherein when said electronic control unit obtains an estimated temperature of said catalyst device from said second estimation process, said electronic control unit controls the electric power applied to energize said catalyst device so that said estimated temperature of said catalyst device approaches a target temperature to be closer thereto than when said first estimation process is performed to provide an estimated temperature of said catalyst device.

4. The vehicle according to claim 1, wherein
said temperature sensor is disposed in an exhaust path that discharges the exhaust gas to outside the vehicle via said catalyst device, said temperature sensor being disposed in a vicinity of said catalyst device and spaced from said catalyst device.

5. A method for controlling a temperature of a catalyst device, said catalyst device being mounted in a vehicle including a motor for travelling and an internal combustion engine, said catalyst device being electrically heatably configured for purifying exhaust gas of said internal combustion engine, the method comprising the steps of:

estimating, via an electronic control unit, a temperature of said catalyst device by a first method of estimating the temperature of said catalyst device by using an output of a temperature sensor sensing a temperature in an exhaust pipe of said internal combustion engine after said vehicle is started by a user until said internal combustion engine starts for a first time while said vehicle is travelling by said motor for travelling;

estimating, via the electronic control unit, a temperature of said catalyst device by a second method of estimating the temperature of said catalyst device by using an output of said temperature sensor while said internal combustion engine is in operation; and controlling, via the electronic control unit, electric power applied to energize said catalyst device, based on said temperatures of said catalyst device as estimated in one of said first and second methods, said second method having a temperature estimation error smaller than a temperature estimation error of said first method, the step of controlling varying the electric power applied to energize said catalyst device, based on a difference between said temperature estimation errors.

* * * * *